United States Patent
Münning et al.

(10) Patent No.: US 10,632,851 B2
(45) Date of Patent: Apr. 28, 2020

(54) METHOD FOR RECHARGING AN ELECTRICAL ENERGY STORAGE DEVICE OF A HYBRID VEHICLE, DRIVE UNIT FOR A HYBRID VEHICLE, AND HYBRID VEHICLE

(71) Applicant: VOLKSWAGEN AKTIENGESELLSCHAFT, Wolfsburg (DE)

(72) Inventors: Daniel Münning, Braunschweig (DE); Christian Felsch, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 254 days.

(21) Appl. No.: 15/729,186

(22) Filed: Oct. 10, 2017

(65) Prior Publication Data
US 2018/0099567 A1 Apr. 12, 2018

(30) Foreign Application Priority Data
Oct. 11, 2016 (DE) .......................... 10 2016 119 289

(51) Int. Cl.
*B60W 10/06* (2006.01)
*B60W 10/08* (2006.01)
(Continued)

(52) U.S. Cl.
CPC .............. *B60L 11/02* (2013.01); *B60L 50/10* (2019.02); *B60L 58/12* (2019.02); *B60W 10/06* (2013.01);
(Continued)

(58) Field of Classification Search
CPC ...... B60W 10/08; B60W 10/06; B60W 20/13; B60W 2050/0026; B60W 2510/244;
(Continued)

(56) References Cited

U.S. PATENT DOCUMENTS 5,881,559 A * 3/1999 Kawamura .............. B60K 6/24
60/597
5,906,098 A * 5/1999 Woollenweber ...... F02B 37/005
60/608
(Continued)

FOREIGN PATENT DOCUMENTS

DE 699 22 221 T2 3/2006
DE 10 2008 023 732 A1 1/2009
(Continued)

OTHER PUBLICATIONS

Search report for German Patent Application No. 10 2016 119 289.9, dated Jul. 14, 2017.

*Primary Examiner* — Mussa A Shaawat
(74) *Attorney, Agent, or Firm* — Pearl Cohen Zedek Latzer Baratz LLP (57) ABSTRACT

In a method for recharging an electrical energy storage device of a hybrid vehicle, the hybrid vehicle includes an internal combustion engine, first and second electric machines, and a drive shaft, the internal combustion engine and the first electric machine are directly mechanically coupled, the second electric machine and the drive shaft are directly mechanically coupled, and the internal combustion engine and the drive shaft are variably mechanically coupled by a gear device. A drive unit for a hybrid vehicle includes an electrical energy storage device, an internal combustion engine, first and second electric machines, and a drive shaft, wherein the internal combustion engine and the first electric machine are directly mechanically coupled, the second electric machine and the drive shaft are directly mechanically coupled, and the internal combustion engine and the drive shaft are variably mechanically coupled by a gear device. A hybrid vehicle can includes the drive unit.

10 Claims, 5 Drawing Sheets

(51) Int. Cl.
  *B60W 20/13* (2016.01)
  *B60L 11/02* (2006.01)
  *B60L 50/10* (2019.01)
  *B60L 58/12* (2019.01)
  *B60L 53/24* (2019.01)

(52) U.S. Cl.
  CPC ............ B60W 10/08 (2013.01); B60W 20/13 (2016.01); *B60L 53/24* (2019.02); *B60W 2510/107* (2013.01); *B60W 2510/244* (2013.01); *Y02T 10/70* (2013.01); *Y02T 10/705* (2013.01); *Y02T 10/7005* (2013.01); *Y02T 10/7044* (2013.01); *Y02T 10/7072* (2013.01); *Y02T 10/7077* (2013.01); *Y02T 90/127* (2013.01); *Y02T 90/14* (2013.01); *Y10S 903/93* (2013.01)

(58) Field of Classification Search
  CPC .. B60W 2520/10; B60K 6/48; B60T 10/7077; B60T 90/14; B60T 10/70; B60T 10/708; B60T 90/127; B60L 50/10; B60L 58/12; B60L 11/02; B60L 53/24
  See application file for complete search history.

(56) References Cited

U.S. PATENT DOCUMENTS

| | | | | |
|---|---|---|---|---|
| 6,809,429 B1* | 10/2004 | Frank | ......................... | B60K 6/46 290/40 C |
| 7,497,285 B1* | 3/2009 | Radev | ................... | B60W 20/13 180/65.225 |
| 2002/0163251 A1* | 11/2002 | Crombez | ................. | B60K 6/44 303/152 |
| 2003/0160455 A1* | 8/2003 | Hu | ......................... | B60K 6/48 290/40 C |
| 2006/0030450 A1* | 2/2006 | Kyle | ......................... | B60K 6/26 477/3 |
| 2006/0174624 A1* | 8/2006 | Grabowski | ............... | B60K 6/40 60/709 |
| 2007/0062191 A1* | 3/2007 | Furman | ..................... | B60K 6/24 60/607 |
| 2007/0095587 A1* | 5/2007 | DuCharme | .............. | B60K 6/12 180/65.31 |
| 2008/0094013 A1* | 4/2008 | Su | ............................. | H02P 5/747 318/139 |
| 2008/0251302 A1* | 10/2008 | Lynn | ........................ | B60K 6/12 180/65.25 |
| 2010/0070122 A1* | 3/2010 | Niimi | ...................... | B60K 6/445 701/22 |
| 2010/0107632 A1* | 5/2010 | Wu | ........................... | B60K 6/48 60/608 |
| 2010/0280737 A1* | 11/2010 | Ewert | ...................... | B60K 6/445 701/102 |
| 2013/0040778 A1* | 2/2013 | Schulte | ..................... | B60K 6/48 477/5 |
| 2013/0166116 A1* | 6/2013 | Chen | ........................ | B60L 58/12 701/22 |
| 2014/0358340 A1* | 12/2014 | Radev | ..................... | B60K 6/442 701/22 |
| 2015/0094189 A1* | 4/2015 | Epureanu | ................. | H02K 1/00 477/3 |
| 2015/0175152 A1* | 6/2015 | Dalum | ..................... | B60K 6/12 477/3 |
| 2016/0059806 A1* | 3/2016 | Thommes | ................. | B60L 1/00 701/29.1 |
| 2018/0126857 A1* | 5/2018 | Kelly-Morgan | ......... | C08L 33/06 |

FOREIGN PATENT DOCUMENTS

| | | |
|---|---|---|
| DE | 10 2008 060 954 A1 | 6/2010 |
| DE | 10 2009 051 472 A1 | 6/2010 |
| DE | 10 2011 003 605 A1 | 8/2012 |
| DE | 10 2013 221814 A1 | 7/2014 |
| DE | 10 2013 210 503 A1 | 12/2014 |
| DE | 11 2015 001785 T5 | 1/2017 |
| GB | 2508665 A | 6/2014 |
| WO | WO 2014 090704 A1 | 6/2014 |

* cited by examiner

METHOD FOR RECHARGING AN ELECTRICAL ENERGY STORAGE DEVICE OF A HYBRID VEHICLE, DRIVE UNIT FOR A HYBRID VEHICLE, AND HYBRID VEHICLE

CROSS-REFERENCE TO RELATED APPLICATIONS

This application claims priority from German Patent Application No. 10 2016 119 289.9, filed Oct. 11, 2016, which is hereby incorporated by reference.

BACKGROUND OF THE INVENTION

The present invention relates to a method for recharging an electrical energy storage device of a hybrid vehicle, the hybrid vehicle including an internal combustion engine, a first electric machine, a second electric machine, and a drive shaft, the internal combustion engine and the first electric machine being directly mechanically coupled, the second electric machine and the drive shaft being directly mechanically coupled, and the internal combustion engine and the drive shaft being variably mechanically coupled by a gear device. Moreover, the present invention relates to a drive unit for a hybrid vehicle, including an electrical energy storage device, an internal combustion engine, a first electric machine, a second electric machine, and a drive shaft, the internal combustion engine and the first electric machine being directly mechanically coupled, the second electric machine and the drive shaft being directly mechanically coupled, and the internal combustion engine and the drive shaft being variably mechanically coupled by a gear device, and a hybrid vehicle that includes a drive unit.

It is known in recent automotive technology to design the vehicles as hybrid vehicles, and to use an internal combustion engine as well as at least one electric machine for the drive of the vehicle. The at least one electric machine may generally be operated as a motor and also as a generator. This type of hybrid vehicle may typically be driven either solely by the internal combustion engine, solely by the at least one electric machine, or by the internal combustion engine and the at least one electric machine together. Two electric machines are often used in recent hybrid vehicles, a first electric machine generally being directly mechanically coupled to the internal combustion engine, for example via a belt drive and/or a switchable belt pulley. In contrast, the second electric machine is often directly coupled to a drive shaft of the hybrid vehicle.

In addition, in hybrid vehicles it is known to recharge an electrical energy storage device, which supplies the electric machines of the hybrid vehicle with electrical energy, during operation of the hybrid vehicle. For this purpose, the electric machines may be operated as generators. In addition to a recuperation mode, in which mechanical kinetic energy of the hybrid vehicle is converted into electrical energy by one of the electric machines, it is also known to drive an electric machine by the internal combustion engine, with the electric machine as a generator converting this mechanical drive energy into electrical energy (see DE 10 2008 060 954 A1, for example). This type of drive of two electric machines by the internal combustion engine in order to generate electrical energy is also basically known (see WO 2014/090704 A1, for example). A control and regulation of an operation of the electric machines, for example with regard to a preferably low loss in the electrical supply to the electric machines and/or an overall torque to be generated, may take place (see DE 10 2013 221 814 A1, for example). However, it is often not possible to provide an optimal recharging of the electrical energy storage device, in particular a particularly energy-efficient and low-loss charging of the electrical energy storage device, in known hybrid vehicles.

The object of the present invention, therefore, is to at least partially eliminate the above-described disadvantages in methods for recharging an electrical energy storage device of a hybrid vehicle, in drive units for a hybrid vehicle, and in hybrid vehicles. The object of the present invention in particular is to provide a method for recharging an electrical energy storage device of a hybrid vehicle, a drive unit for a hybrid vehicle, and a hybrid vehicle, which easily and cost-effectively allow a particularly energy-efficient and low-loss recharging of the electrical energy storage device, in particular the electrical energy to be generated being distributed to two electric machines in an optimized manner.

SUMMARY OF THE INVENTION

The above object is achieved by the patent claims. In particular, the above object is achieved by a method for recharging an electrical energy storage device of a hybrid vehicle, by a drive unit for a hybrid vehicle, and by a hybrid vehicle according to the independent claims. Further advantages of the present invention result from the subclaims, the description, and the drawings. Features described in conjunction with a method according to the present invention naturally also apply in conjunction with a drive unit according to the present invention and with a hybrid vehicle according to the present invention, and in each case conversely, so that reciprocal reference is or may always be made with regard to the disclosure of the individual aspects of the present invention.

According to a first aspect of the present invention, the object is achieved by a method for recharging an electrical energy storage device of a hybrid vehicle, the hybrid vehicle including an internal combustion engine, a first electric machine, a second electric machine, and a drive shaft, the internal combustion engine and the first electric machine being directly mechanically coupled, the second electric machine and the drive shaft being directly mechanically coupled, and the internal combustion engine and the drive shaft being variably mechanically coupled by a gear device. A method according to the present invention is characterized by the following steps:

a) ascertaining data of operating parameters of the hybrid vehicle with the aid of sensor devices, b) evaluating the data, ascertained in step a), with the aid of a control unit, c) specifying a distribution of a generation of electrical energy, required for the recharging, to the first electric machine and the second electric machine, based on the evaluation carried out in step b), d) driving the first electric machine and/or the second electric machine by the internal combustion engine in order to generate the electrical energy based on the distribution specified in step c), and e) recharging the electrical energy storage device by the electrical energy generated in step d).

An electrical energy storage device of a hybrid vehicle may be recharged by a method according to the present invention. Within the meaning of the present invention, a hybrid vehicle includes in particular an internal combustion engine, a first electric machine, and a second electric machine. The hybrid vehicle may also include even further components, such as a further energy storage device, in particular for a vehicle electrical system of the hybrid vehicle. The electric machines may be operated as electric motors and also as generators. Within the meaning of the present invention, a recharging differs in particular from a charging by recuperation, since, regardless of the electric machine used, the internal combustion engine is used for driving the electric machine that is used and operated as a generator. In a hybrid vehicle, whose electrical energy storage device may be recharged by a method according to the present invention, the first electric machine is directly mechanically coupled to the internal combustion engine. For such a direct mechanical coupling of the first electric machine and the internal combustion engine, a belt drive, for example, or also a coupling element such as a switchable belt pulley, may be used. In addition, the second electric machine and a drive shaft of the hybrid vehicle may likewise be directly mechanically coupled to one another. The drive shaft may be designed for driving the front wheels and/or the rear wheels of the hybrid vehicle. Within the meaning of the present invention, "directly mechanically coupled" means in particular that the rotational speeds of the coupled devices, in the present case the internal combustion engine and the first electric machine, or the second electric machine and the drive shaft, have a fixed ratio relative to one another. In particular, an adjustable gear element for changing a transmission, and thus a ratio of the rotational speeds of the mechanically coupled devices, is not provided in this type of direct mechanical coupling. However, such a gear device is provided between the internal combustion engine and the drive shaft, as the result of which the internal combustion engine and the drive shaft are variably mechanically coupled to one another. A ratio of the rotational speeds of the internal combustion engine and the drive shaft may thus be variably set by selecting various gears in the gear device. In particular, due to this variable mechanical coupling of the internal combustion engine and the drive shaft, the second electric machine is also automatically variably mechanically coupled to the internal combustion engine. The gear device may also include a clutch element, or such a clutch element may additionally be provided, so that the drive shaft and thus also the second electric machine may be mechanically decoupled from the internal combustion engine. A disconnection of the second electric machine from the drive shaft may also be provided via additional appropriately situated clutch elements, for example to be able to avoid entrainment of the second electric machine at high vehicle speeds.

Data of operating parameters of the hybrid vehicle are ascertained in a first step a) of a method according to the present invention. Suitable sensor devices are used for this ascertainment. These sensor devices may be sensors that are provided specifically for a method according to the present invention, or also sensors that are already present in the particular hybrid vehicle. Within the meaning of the present invention, operating parameters may be any parameters that may occur during operation of the hybrid vehicle, for example a vehicle speed, temperatures, in particular of components of the hybrid vehicle, an engaged gear or a transmission ratio of a gear device, and/or a propulsion or deceleration intent of a user of the hybrid vehicle. In addition, within the meaning of the present invention, parameters of the electrical system of the hybrid vehicle that may be measured and also predicted, for example a state of charge of the electrical energy storage device, one or multiple voltage level(s) in the electrical lines, and also a corresponding need for electrical energy, are also regarded as operating parameters. A comprehensive overview of a state of the hybrid vehicle may thus be provided by such an ascertainment of data of these operating parameters.

This takes place in next step b) of a method according to the present invention, in which the data ascertained in step a) are evaluated by a control unit. The ascertained data may in particular be compared to limiting values, for example, during such an evaluation. An assessment of the instantaneous state of the hybrid vehicle may be provided in this way. In addition, computations based on the ascertained data may take place during such an evaluation. Thus, even variables that are not directly measurable, for example a remaining cruising range of the hybrid vehicle or a variation over time to be expected for a state of charge of the electrical energy storage device, may be made available based on the data ascertained in step a). Furthermore, an ascertainment of further information, for example concerning efficiencies or the like, is also providable by the evaluation. Overall, processing of the data may thus be carried out, and further variables that describe the operation of the hybrid vehicle may be provided, by such an evaluation.

The results of the evaluations carried out in step b) are used in next step c) to specify a distribution of the energy to be generated. In this distribution it is also possible in principle to take into account a need for electrical energy, which may be ascertained, for example, by an evaluation of operating data of the electrical energy storage device. Within the meaning of the present invention, the distribution of the electrical energy required for recharging the electrical energy storage device is understood in particular to mean that a generation of the electrical energy may be provided by the first electric machine and also by the second electric machine. Based on the results of the evaluation carried out in step b), the site of generation of this electrical energy is now distributed to the two electric machines in step c). Thus, in each case one of the electric machines alone may be used for generating the required electrical energy. In addition, within the meaning of the present invention a distribution of the electrical energy to be generated to the two electric machines is conceivable and possible, so that the first electric machine is provided for generating a first portion of the required electrical energy, and the second electric machine is provided for the remaining portion. In particular, this distribution may be carried out in such a way that a preferably high efficiency or a preferably low loss may be achieved during generation of the electrical energy. This may be provided by basing the specification of the distribution on the evaluation carried out in step b), in which an instantaneous state of the hybrid vehicle is mapped.

In subsequent step d) of a method according to the present invention, the required electrical energy is generated, in particular based on the distribution specified in step c). In other words, based on the specification carried out in step c), the two electric machines are controlled in order to generate the electrical energy required for the recharging of the electrical energy storage device. The electrical energy may be generated by one of the two electric machines, depending on the specified distribution. Within the meaning of the present invention, a joint generation of the electrical energy by both electric machines, in any desired distribution, is also conceivable and possible. According to the present invention, it is provided that the electric machines for generating the required electrical energy are driven by the internal combustion engine. A method according to the present invention thus involves recharging the electrical energy storage device. Due to the distribution of the generation, specified in step c), to the two electric machines, this recharging may be carried out particularly efficiently and with low loss.

The last step e) of a method according to the present invention is used for supplying the electrical energy generated in step d) to the electrical energy storage device. The electrical energy storage device is recharged in this way. Sufficient charging of the electrical energy storage device of the hybrid vehicle may thus be ensured overall by a method according to the present invention in a particularly simple and reliable manner, and at the same time particularly efficiently and with low loss.

In addition, in a method according to the present invention it may be provided that at least one of the following operating parameters is ascertained in step a):

need for electrical energy
vehicle speed
transmission ratio of the gear device.

This list is not exhaustive, so that if it is meaningful and necessary, even further operating parameters may be ascertained in step a) of a method according to the present invention. The need for electrical energy, for example ascertained directly or determined indirectly via a state of charge and/or a voltage of the electrical energy storage device, allows electrical power that is to be generated, and thus a basis for the specification of the distribution carried out in step c), to be provided. Thus, for example, lesser electrical power may often be generated by the second electric machine particularly efficiently and with low loss. A vehicle speed has an influence in particular on the electrical energy that may be generated by the second electric machine. This is due in particular to the fact that the second electric machine is directly mechanically coupled to the drive shaft, and the rotational speed of the electric machine in turn directly determines the generatable electrical energy or providable electrical power. For generation of the electrical energy, the second electric machine is driven by the internal combustion engine, to which it is variably mechanically coupled via the gear device. The transmission ratio of the gear device thus likewise has a great influence on the energy that is generatable by the second electric machine within the scope of a method according to the present invention. A method according to the present invention may be further improved overall by an ascertainment of at least these operating parameters.

In addition, a method according to the present invention may be designed in such a way that the efficiencies for a use of the first electric machine and for a use of the second electric machine in step d) are computed and compared in step b). For recharging the electrical energy storage device, both electric machines may be used as generators in step d) of a method according to the present invention. For this purpose, the electric machines are each driven by the internal combustion engine. The efficiencies for this use are computed in each case from the electrical energy or power generated by the particular electric machine, divided by the mechanical energy or power that must be provided for this purpose by the internal combustion engine. A higher efficiency for one of the two cases that results from a comparison automatically means that a generation of electrical energy in this distribution may be carried out more efficiently and with lower loss. The specification in step c) may thus be simplified and improved by a computation of the efficiencies.

In addition, in a method according to the present invention it may be provided that a temperature, in particular a temperature of the gear device, and/or an operating period of the hybrid vehicle are/is taken into account in step c) in specifying the distribution. As described above, the second electric machine is mechanically variably coupled to the internal combustion engine via the gear device. In particular in this gear device, but also in other mechanical components of a hybrid vehicle that are relevant for a method according to the present invention, lubricants such as oils and/or greases are generally used to minimize friction losses and signs of wear. However, these lubricants may have a high viscosity, in particular at low temperatures, as the result of which mechanical power losses may occur in the gear device, for example. This may be the case in particular at the start of operation of a hybrid vehicle. These power losses are much lower at a later time in the operation of a hybrid vehicle when the lubricants are in particular warmed up and then have a higher temperature. Thus, by taking into account a temperature, in particular the temperature of the gear device, and/or an operating period of the hybrid vehicle, an even more accurate and better adapted specification of the distribution may be carried out in step c). A recharging of the electrical energy storage device may thus be carried out particularly efficiently and with low loss overall.

A method according to the present invention may preferably be designed in such a way that a vehicle speed is ascertained as the operating parameter in step a), and this ascertained vehicle speed is evaluated in step b) by a comparison to a limiting speed, and that for a vehicle speed that is greater than the limiting speed, a generation of the electrical energy is specified only by the second electric machine in step c). In a hybrid vehicle that carries out a method according to the present invention, the second electric machine is directly mechanically coupled to a drive shaft of the hybrid vehicle. In other words, the ratio of a rotational speed of the second electric machine to a rotational speed of the drive shaft is constant or at least essentially constant, as the result of which the rotational speed of the second electric machine is also directly proportional to a vehicle speed of the hybrid vehicle. For electric machines, in addition a higher rotational speed is generally associated with a generation of greater electrical power, at least in a lower rotational speed range. A method according to the present invention may thus be simplified by specifying the distribution based on a speed of the hybrid vehicle. For this purpose, this vehicle speed is ascertained in step a) of a method according to the present invention. The information concerning the speed may also be obtained, for example, from a vehicle information system in which this speed is present as a data set. This vehicle speed is compared to a limiting speed in step b) of a method according to the present invention. The limiting speed may have already been determined in advance, and is preferably selected in such a way that for a vehicle speed above the limiting speed, a generation of electrical energy by the second electric machine is reliably more efficient and has lower loss than a generation by the first electric machine. The limiting speed is generally a function of the overall configuration of the hybrid vehicle; approximately 40 km/h has often proven to be a suitable value for the limiting speed. If it is determined in the evaluation in step b) of a method according to the present invention that the vehicle speed of the hybrid vehicle is greater than the limiting speed, a distribution of the electrical energy to be generated is carried out in step c) in such a way that only the second electric machine is used for generating the electrical energy. This distribution may also be carried out when the vehicle speed and the limiting speed are identical or at least essentially identical. This represents particularly simple decision-making, and is also electrically or electronically implementable in a particularly simple manner. A particularly efficient and low-loss recharging of an electrical energy storage device of a hybrid vehicle may thus be provided without great electrical and/or electronic complexity. In addition to the complete generation of the electrical energy by the second electric machine described in this paragraph, it is also possible for only a certain portion of the required electrical energy to be generated by the second electric machine when a vehicle speed is above the limiting speed. The advantages described above may also be provided by such a distribution, which preferably is specified in advance.

According to one preferred refinement, in a method according to the present invention it may also be provided that a need for electrical energy as the operating parameter is additionally ascertained in step a), and this ascertained need for electrical energy is evaluated in step b) by a comparison to a limiting need, and that a generation of the electrical energy only by the first electric machine is specified in step c) when a vehicle speed is less than the limiting speed and a need is greater than the limiting need, and that a generation of the electrical energy only by the second electric machine is specified in step c) when a vehicle speed is less than the limiting speed and a need is less than the limiting need. This refinement of a method according to the present invention concerns the cases in which the ascertained vehicle speed is less than the limiting speed. For these cases it is advantageous to also take into account an electrical need in specifying the distribution of the electrical energy to be generated. Thus, it has been found that at low vehicle speeds, with regard to an efficiency of the generation by the first or the second electric machine there is a clear dependency on the electrical power to be generated. This may be due to the fact that the second electric machine is directly mechanically coupled to the drive shaft of the hybrid vehicle, i.e., at low vehicle speeds is not able to rotate at an arbitrary speed. In addition, losses may occur due to the variable mechanical coupling via the gear device. The electrical power that is generatable by the second electric machine is thus limited. Overall, it has been found that below a limiting need, which may be specified with regard to an electrical power between 1000 W and 2000 W, for example, in particular also in advance, a generation of the required electrical energy by the second electric machine is generally more efficient and has lower loss, but above the limiting need a generation by the first electric machine is generally more efficient and has lower loss. In addition, when the electrical need is identical or at least essentially identical to the limiting need, in a method according to the present invention the first electric machine may be specified for generating the electrical energy. Due to the additional ascertainment of the electrical need in step a) and its evaluation in step b), also for vehicle speeds less than the limiting speed, a distribution of the electrical energy to be generated to either the first or the second electric machine may thus be provided in step c) which is easily implementable electrically and/or electronically, and via which at the same time, a particularly efficient and low-loss recharging of an electrical energy storage device of a hybrid vehicle may be provided.

Furthermore, a method according to the present invention may be refined in such a way that the value used for the limiting need is selected as a function of a transmission ratio of the gear device. As described above, electrical power that is generatable by an electric machine is generally a function of a rotational speed of the electric machine, and for the second electric machine, due to its direct mechanical coupling to the drive shaft, is also a function of the vehicle speed. Gear devices are provided to be able to variably set a rotational speed between the internal combustion engine and the drive shaft, for example via individual gears having fixed rotational speed ratios, or also continuously. A rotational speed ratio between the internal combustion engine and the second electric machine thus also automatically changes. This may have an effect on the limiting need, for which a generation of the electrical power by the second electric machine, which is variably mechanically coupled to the internal combustion engine via the drive shaft and the gear device, is more efficient and has lower loss than a generation by the first electric machine, which is directly mechanically coupled to the internal combustion engine. For a multispeed transmission, a limiting need for electrical power of, for example, 1000 W for a first gear, 1500 W for a second gear, and 2000 W for a third gear, may be used. For even higher gears, and thus for correspondingly high vehicle speeds or rotational speeds of the second electric machine, for example an infinitely high limiting need may also be used, so that in these gears the second electric machine is always used for generating the electrical energy for recharging the electrical energy storage device. A method according to the present invention may thus be further improved due to a dependency of the limiting need on a transmission ratio of the gear device.

According to one particularly preferred refinement of a method according to the present invention, it may also be provided that, for generating hysteresis in the distribution in step c) for the limiting speed and/or the limiting need for electrical power, a value is used that is selected as a function of a distribution that has already taken place. Due to the above-described case distinctions with regard to the vehicle speed and the limiting speed, or with regard to the need for electrical power or energy and the limiting need, the particular value under consideration, i.e., the vehicle speed or the need for electrical energy, may be close to the particular limiting value. Since these considered values may continuously change and also be subject to fluctuations during operation of the hybrid vehicle, situations may occur while carrying out a method according to the present invention in which the comparison in question provides different results in a short time sequence, which result in changes in the specification of the distribution in the electric machine provided for generating the required electrical energy. To avoid this, hysteresis may be provided in a method according to the present invention. This hysteresis is provided by selecting the particular limiting values used as a function of a distribution that has already taken place. In other words, the limiting values are selected as a function of the electric machine that is being used at the moment for generating the required energy. Thus, for example, a higher value, for example 40 km/h, may be selected for the limiting speed when the first electric machine was most recently active, and a lower value, for example 35 km/h, may be selected when the second electric machine was most recently used for generating the required electrical energy. In the case distinction described above, it is possible for the particular electric machine that is being used at the moment to be kept operating longer, in particular also immediately after a change in the electric machine used. In other words, maintaining the instantaneous distribution via such hysteresis is preferred. The same may be provided for the need for electrical energy. A lower value, for example 900 W, may be used here for the limiting need when the first electric machine is active, and a higher value, for example 1000 W, may be used when the second electric machine is used for generating the required electrical energy. Also due to this hysteresis, in the case distinction described above the particular electric machine that is being used at the moment may be kept operating longer, in particular also immediately after a change in the electric machine used. In particular, the limiting need may also in turn be selected as the function of a transmission ratio. The above-mentioned values are to be understood as examples of a low transmission ratio, in particular a first gear, for example; for higher transmission ratios or gears, suitable values for the corresponding limiting needs may be selected, for example 1400 W and 1500 W for a second gear or 1800 W and 2000 W for a third gear. A method according to the present invention may thus be improved overall in such a way that an avoidable switchover of the electric machine used for generating the required electrical energy in short time intervals may be avoided.

According to a second aspect of the present invention, the object is achieved by a drive unit for a hybrid vehicle, including an electrical energy storage device, an internal combustion engine, a first electric machine, a second electric machine, and a drive shaft, the internal combustion engine and the first electric machine being directly mechanically coupled, the second electric machine and the drive shaft being directly mechanically coupled, and the internal combustion engine and the drive shaft being variably mechanically coupled by a gear device. A drive unit according to the present invention is characterized in that the drive unit includes a control unit and sensor devices for carrying out a method according to the first aspect of the present invention. A drive unit according to the present invention is thus designed overall for carrying out a method according to the present invention according to the first aspect of the present invention. In this way, all advantages that have already been described in detail with regard to a method according to the present invention according to the first aspect [of the] present invention may also be provided by a drive unit according to the second aspect of the present invention.

According to a third aspect of the present invention, the object is achieved by a hybrid vehicle that includes a drive unit. A hybrid vehicle according to the present invention is characterized in that the drive unit is designed according to the second aspect of the present invention. A drive unit according to the present invention according to the second aspect of the present invention is designed for carrying out a method according to the present invention according to the first aspect of the present invention. In this way, all advantages that have already been described in detail with regard to a drive unit according to the second aspect [of the] present invention or with regard to a method according to the present invention according to the first aspect [of the] present invention may also be provided by a hybrid vehicle according to the third aspect [of the] present invention.

BRIEF DESCRIPTION OF THE DRAWINGS

Further measures that enhance the present invention result from the following description of various exemplary embodiments of the present invention, which are schematically illustrated in the figures. All features and/or advantages, including structural details and spatial configurations, that arise from the claims, the description, or the figures may be important to the present invention, alone or also in the various combinations. Elements having the same function and/or mode of operation are provided with the same reference numerals in FIGS. 1 through 5.

DETAILED DESCRIPTION OF THE INVENTION

Figure 1:
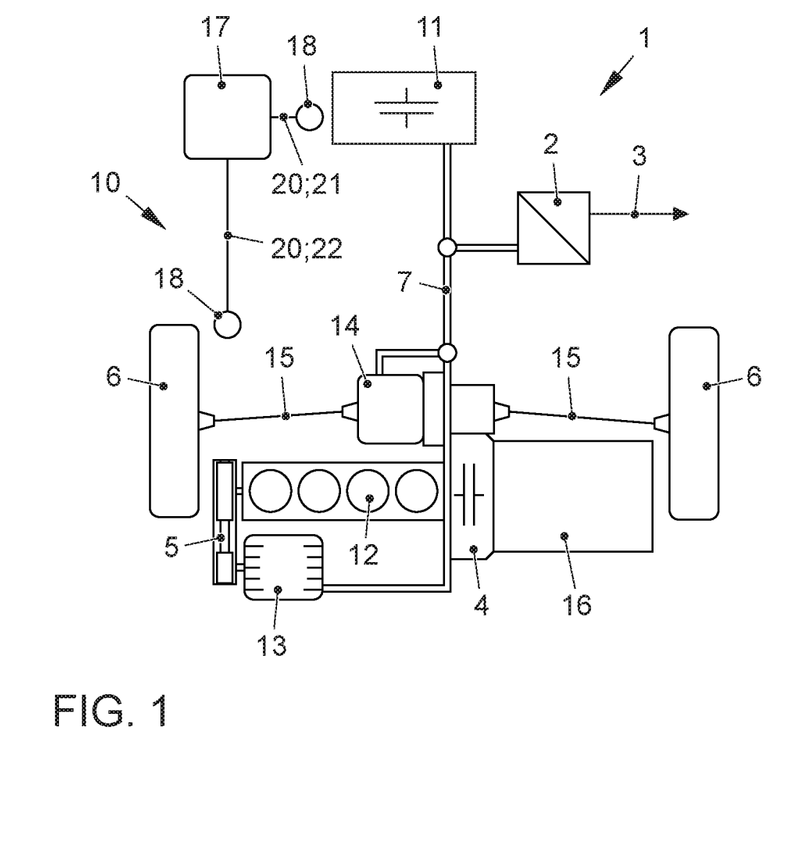
FIG. 1 shows two views of a hybrid vehicle according to the present invention.

FIG. 1 shows two schematic views of a hybrid vehicle 1 according to the present invention, the left diagram schematically illustrating the individual components, and the right diagram schematically showing the mechanical coupling of the components that are relevant for a method according to the present invention. The two diagrams in FIG. 1 are described together in the following discussion.

A hybrid vehicle 1 according to the present invention includes a drive unit 10 including an internal combustion engine 12, a first electric machine 13, and a second electric machine 14. First electric machine 13 is directly mechanically coupled to internal combustion engine 12 via a belt 5, as the result of which the rotational speeds of internal combustion engine 12 and of first electric machine 13 have a fixed ratio. Internal combustion engine 12 is variably mechanically coupled via a gear device 16 to a drive shaft 15 and the drive wheels associated with same. A ratio of the rotational speeds of internal combustion engine 12 and of drive shaft 15 may thus be variably changed, at least in steps. A clutch 4, which may be part of gear device 16, allows a disconnection of the mechanical coupling between internal combustion engine 12 and drive shaft 15. Second electric machine 14 is directly mechanically coupled to drive shaft 15, as the result of which the rotational speeds of drive shaft 15 and of second electric machine 14 likewise have a fixed ratio. A variable mechanical coupling of second electric machine 14 and of internal combustion engine 12 thus automatically results via gear device 16. First electric machine 13 and second electric machine 14 are situated together in an electrical traction network 7 in which an electrical energy storage device 11 is also situated. Traction network 7 is also electrically conductively connected to a vehicle electrical system 3 of hybrid vehicle 1 via a direct current converter 2. Both electric machines 13, 14 may be operated as electric motors for driving hybrid vehicle 1 and also as generators for generating electrical energy 50 for recharging and/or charging electrical energy storage device 11. For recharging, both electric machines 13, 14 are driven by internal combustion engine 12.

In addition, illustrated hybrid vehicle 1 includes a control unit 17 that is designed for carrying out a method according to the present invention. For this purpose, control unit 17 is in particular connected to sensor devices 18, via which operating parameters 20, for example a need 21 for electrical energy 50, and/or a vehicle speed 22, may be ascertained in a first step a) of a method according to the present invention. Additional operating parameters 20, for example temperatures, in particular of components of hybrid vehicle 1, and/or a transmission ratio 23 (not depicted) of gear device 16, may also be ascertained by suitable sensor devices 18 (likewise not depicted). Ascertained operating parameters 20 are evaluated by control unit 17 in step b) of a method according to the present invention, and electrical energy 50 to be generated is distributed 61 to first electric machine 13 and second electric machine 14, based on the evaluation in step c) of a method according to the present invention. In this specification, the particular electric machine 13, 14 whose use has the best efficiency 30 (not depicted) for this purpose may preferably be used for generating required electrical energy 50. Electric machines 13, 14 are driven by internal combustion engine 12, based on specified distribution 61 for generating electrical energy 50 (not depicted), in subsequent step d) of a method according to the present invention. Electrical energy storage device 11 is recharged by this generated electrical energy 50 in last step e) of a method according to the present invention. Due to targeted distribution 61 of the generation of electrical energy 50 to first electric machine 13 and to second electric machine 14, based on an evaluation of ascertained operating parameters 20, a particularly efficient and low-loss recharging of electrical energy storage device 11 may be provided overall.

Figure 2:
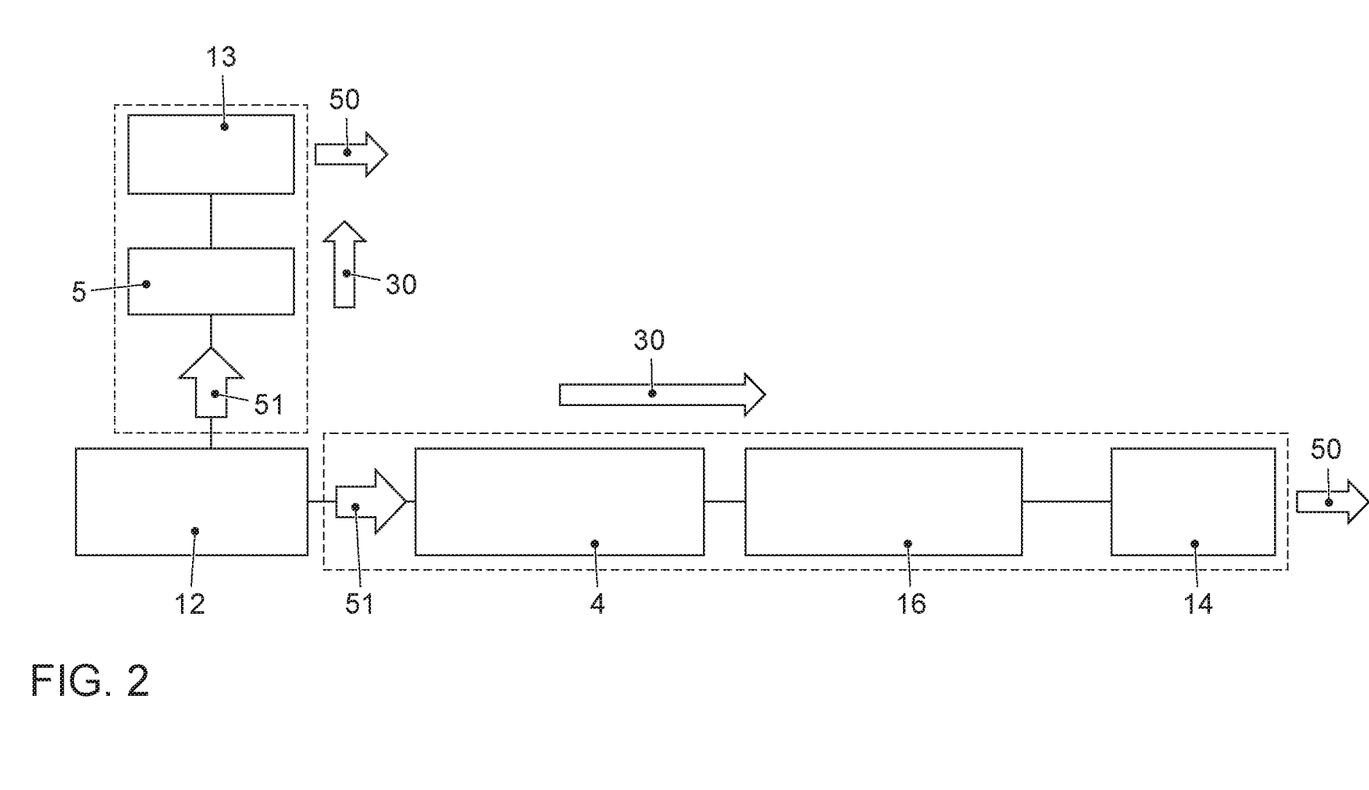
FIG. 2 shows an energy flow chart.

Efficiencies 30 mentioned with reference to FIG. 1 are schematically shown in FIG. 2. Mechanical energy 51 is generated by internal combustion engine 12 and transmitted to first electric machine 13 and second electric machine 14. First electric machine 13 is mechanically coupled directly to internal combustion engine 12 by a belt 5. Second electric machine 14 is variably mechanically coupled to internal combustion engine 12 via a clutch 4 and a gear device 16. Both electric machines 13, 14 convert mechanical energy 51 generated by internal combustion engine 12 into electrical energy 50. The particular efficiency 30 results from the ratio of electrical energy 50 generated by the particular electric machine 13, 14 to mechanical energy 51 to be provided for this purpose by internal combustion engine 12. Within the scope of a method according to the present invention, it is now preferably provided to use the particular electric machine 13, 14 whose operation has a higher efficiency 30 for generating required electrical energy 50, and thus for recharging electrical energy storage device 11 (not depicted). In particular via this procedure, a particularly efficient and low-loss recharging of electrical energy storage device 11 may be provided overall.

Figure 3:
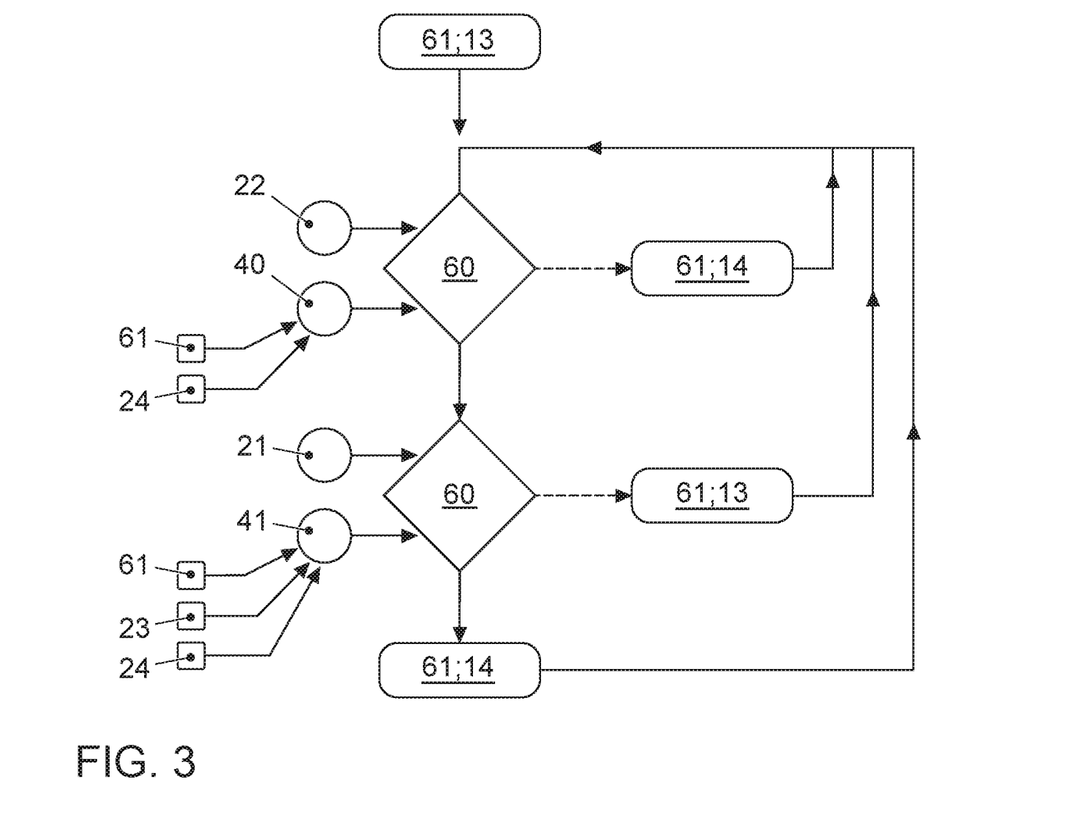
FIG. 3 shows a method according to the present invention.

FIG. 3 schematically shows a method according to the present invention, in particular step c) of a method according to the present invention, in which a generation of electrical energy 50 (not depicted) required for the recharging is distributed 61 to first electric machine 13 and to second electric machine 14. In this embodiment of a method according to the present invention, a decision process, illustrated by a flow chart, is provided which may run in a control unit 17 of a hybrid vehicle 1 according to the present invention (in each case not depicted). As the starting point, illustrated as the input parameter shown at the top end, it is assumed that first electric machine 13 has been specified for generating electrical energy 50 (not depicted) in a prior distribution 61. It may thus be taken into account in particular that when hybrid vehicle 1 is at a standstill, only first electric machine 13 may be used for generating electrical energy 50, since second electric machine 14 is likewise at a standstill due to its direct mechanical coupling to drive shaft 15 (not depicted).

A vehicle speed 22 is now compared to a limiting speed 40 in a first comparison 60. Vehicle speed 22 may preferably be ascertained by a sensor device 18 (not depicted). Limiting speed 40 may in particular also be a function of parameters, for example a temperature 24 of a gear device 16 (not depicted) of hybrid vehicle 1. Taking into account prior distributions 61 in limiting speed 40 allows hysteresis 42 (not depicted) to be provided in order to prevent too rapid a change in a specification of distribution 61 during only slight fluctuations in vehicle speed 22. If it is now determined in comparison 60 that vehicle speed 22 is greater than limiting speed 40, illustrated in the diagram by a dashed-line arrow pointing to the right, second electric machine 14 is used for generating required electrical energy 50 in subsequent distribution 61. This distribution 61 in turn is used as the input parameter in next comparison 60.

If it is determined in first comparison 60 that vehicle speed 22 is less than limiting speed 40, depicted in the diagram by a solid arrow pointing downward, a further comparison 60 between a need 21 for electrical energy 50 and a limiting need 41 is carried out. Need 21 for electrical energy 50 may preferably also be ascertained by a sensor device 18. Limiting need 41 may in turn be a function of parameters, in particular the parameters mentioned above with regard to limiting speed 40, of a temperature 24 and a prior distribution 61, the latter in particular for providing hysteresis 42. In addition, a transmission ratio 23 of a gear device 16 (not depicted) may also be taken into account in limiting need 41, via which driving of second electric machine 14 by internal combustion engine 12 (not depicted) is significantly influenced. If it is now determined in second comparison 60 that ascertained need 21 is greater than limiting need 41, illustrated in the diagram by a dashed-line arrow pointing to the right, first electric machine 13 is used for generating required electrical energy 50 in subsequent distribution 61. Otherwise, as depicted in the diagram by a solid arrow pointing downward, second electric machine 14 is specified in distribution 61. The particular distribution 61 is in turn used as the input parameter in next comparison 60.

Overall, the decision criteria in comparisons 60 are selected in such a way that the particular electric machine 13, 14 via which a generation of required electrical energy 50 may be carried out with a particularly high efficiency 30 (not depicted) is always specified for generating required electrical energy 50 in subsequent distribution 61. A recharging of an electrical energy storage device 11 of a hybrid vehicle 1 (in each case not depicted) may thus be provided particularly efficiently and with low loss.

Figure 4:
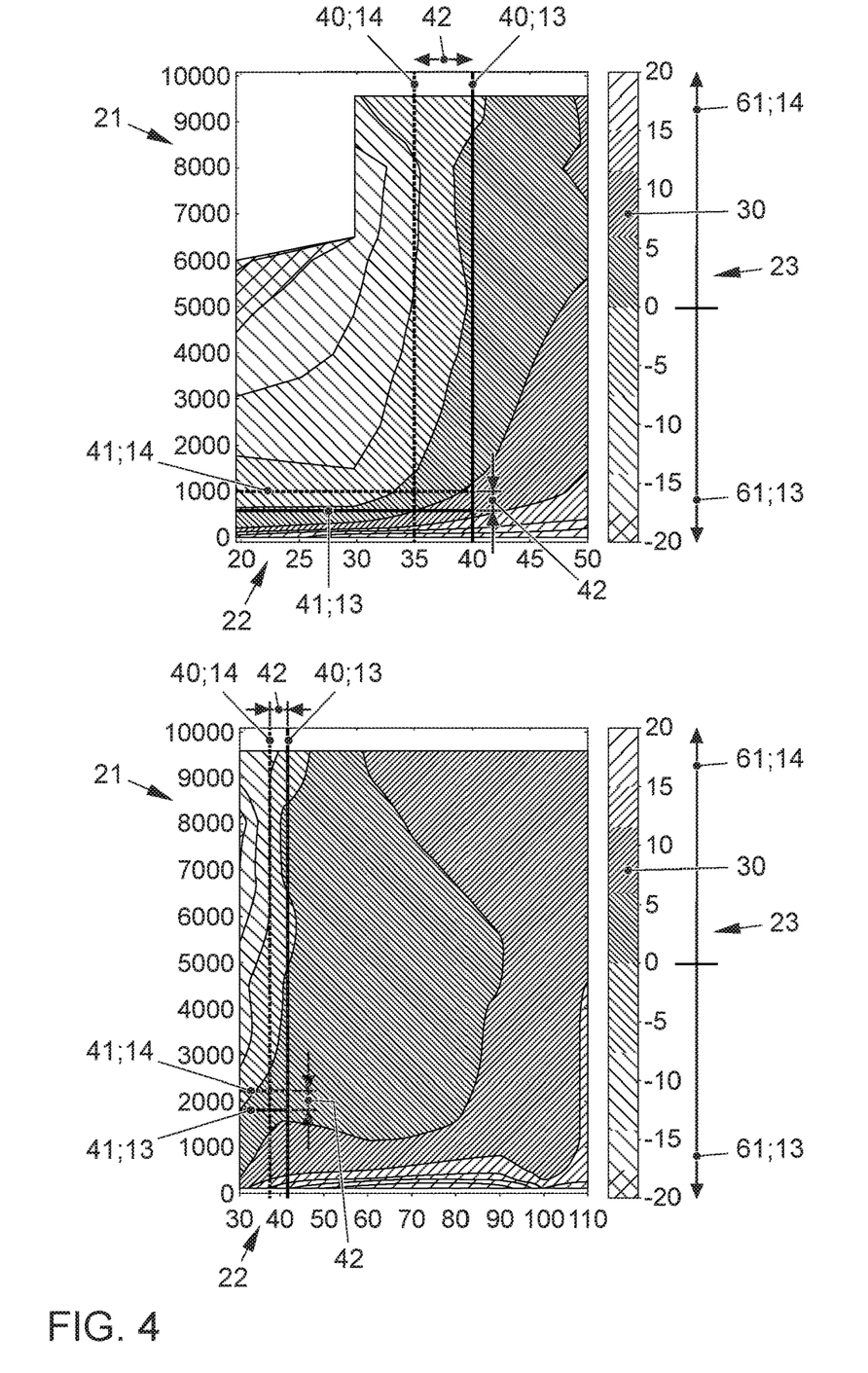
FIG. 4 shows diagrams with efficiencies.

FIG. 4 shows two diagrams which in each case depict a difference in efficiencies 30 that would result during a distribution 61 to first electric machine 13 or to second electric machine 14 in the generation of required electrical energy 50 (not depicted). In the diagrams, a positive difference indicates a specification of distribution 61, to be preferred, with second electric machine 14, and a negative difference indicates a specification of distribution 61, to be preferred, with second electric machine 14. The two diagrams differ in that the top diagram has been created for a lower transmission ratio 23, for example a first gear of a gear device 16 (not depicted), and the bottom diagram has been created for a higher transmission ratio 23, for example a third gear of gear device 16. A vehicle speed 22 is plotted in each case on the x axis, and a need 21 for electrical energy 50 is plotted on the y axis. The difference in efficiencies 30 has been ascertained and plotted for each combination of vehicle speed 22 and need 21. It is clearly apparent in both diagrams that for high vehicle speeds 22, for example greater than approximately 40 km/h, a generation of required electrical energy 50 by driving second electric machine 14 by internal combustion engine 12 (not depicted), regardless of need 21 for electrical energy 50, is to be preferred. This is taken into account by plotted limiting speed 40, which is used for first comparison 60 (not depicted) in the sequence of step c) of a method according to the present invention shown in FIG. 3. In contrast, at low vehicle speeds 22 there is a strong dependency of the difference on need 21 for electrical energy 50; for a higher need 21, a generation of electrical energy 50 by first electric machine 13 is to be rather preferred. In addition, a clear dependency of the difference on transmission ratio 23 is apparent from a comparison 60 of the two diagrams. Limiting need 41, likewise used in the sequence shown in FIG. 3, is thus preferably also selected as a function of transmission ratio 23.

In addition, in each case two different values for limiting speeds 40 and for limiting needs 41 are plotted in these diagrams, depending on whether first electric machine 13 or second electric machine 14 has been specified for generating required electrical energy 50 in a previously carried out distribution 61. Hysteresis 42 may thus be provided when passing through the sequence shown in FIG. 3. In particular, an inadvertent and often harmful switchover in rapid succession between the two electric machines 13, 14 as the generator of required electrical energy 50 may be avoided. In other words, maintaining instantaneous distribution 61 by such hysteresis 42 is preferred.

Figure 5:
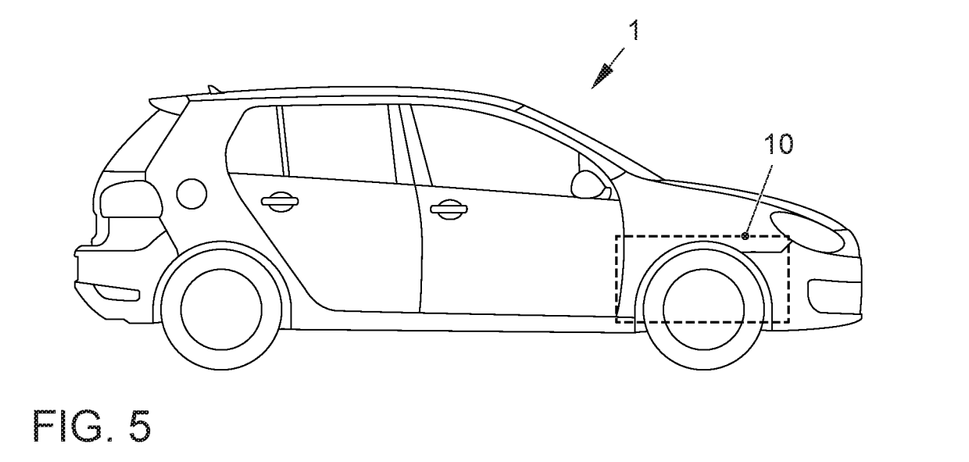
FIG. 5 shows a hybrid vehicle according to the present invention.

FIG. 5 shows a hybrid vehicle 1 including symbolically depicted drive unit 10 according to the present invention. Hybrid vehicle 1 according to the present invention may also be improved overall by using a drive unit 10 according to the present invention which in particular is designed for carrying out a method according to the present invention. In particular, a particularly effective and low-loss recharging of an electrical energy storage device 11 (not depicted) may be carried out in this type of hybrid vehicle 1 according to the present invention.

LIST OF REFERENCE NUMERALS 1 hybrid vehicle
2 direct current converter
3 vehicle electrical system
4 clutch
5 belt
6 drive wheel
7 traction network
10 drive unit
11 energy storage device
12 internal combustion engine
13 first electric machine
14 second electric machine
15 drive shaft
16 gear device
17 control unit
18 sensor device
20 operating parameter
21 need
22 vehicle speed
23 transmission ratio
24 temperature
30 efficiency
40 limiting speed
41 limiting need
42 hysteresis
50 electrical energy
51 mechanical energy
60 comparison
61 distribution

The invention claimed is:

1. A method for recharging an electrical energy storage device of a hybrid vehicle, the hybrid vehicle including an internal combustion engine, a first electric machine, a second electric machine, and a drive shaft, the internal combustion engine and the first electric machine being directly mechanically coupled, the second electric machine and the drive shaft being directly mechanically coupled, and the internal combustion engine and the drive shaft being variably mechanically coupled by a gear device, wherein the method comprises:
   a) ascertaining data of operating parameters of the hybrid vehicle with the aid of sensor devices,
   b) evaluating the data, ascertained in step a), with the aid of a control unit,
   c) specifying a distribution of a generation of electrical energy, required for the recharging, to the first electric machine and the second electric machine, based on the evaluation carried out in step b),
   d) driving the first electric machine and/or the second electric machine by the internal combustion engine in order to generate the electrical energy based on the distribution specified in step c), and
   e) recharging the electrical energy storage device by the electrical energy generated in step d).

2. The method as recited in claim 1, wherein at least one of the following operating parameters is ascertained in step a):
   need for electrical energy;
   vehicle speed, and
   transmission ratio of the gear device.

3. The method as recited in claim 1, wherein the efficiencies for a use of the first electric machine and for a use of the second electric machine in step d) are computed and compared in step b).

4. The method as recited in claim 1, wherein a temperature of the gear device and/or an operating period of the hybrid vehicle are/is taken into account in step c) in specifying the distribution.

5. The method as recited in claim 1, wherein a vehicle speed is ascertained as the operating parameter in step a), and this ascertained vehicle speed is evaluated in step b) by a comparison to a limiting speed, and for a vehicle speed that is greater than the limiting speed, a generation of the electrical energy only by the second electric machine is specified in step c).

6. The method as recited in claim 5,
   wherein a need for electrical energy as the operating parameter is additionally ascertained in step a), and this ascertained need for electrical energy is evaluated in step b) by a comparison to a limiting need, and a generation of the electrical energy only by the first electric machine is specified in step c) when a vehicle speed is less than the limiting speed and a need is greater than the limiting need, and
   wherein a generation of the electrical energy only by the second electric machine is specified in step c) when a vehicle speed is less than the limiting speed and a need is less than the limiting need.

7. The method as recited in claim 6, wherein the value used for the limiting need is selected as a function of a transmission ratio of the gear device.

8. The method as recited in claim 5, wherein, for generating hysteresis in the distribution in step c) for the limiting speed and/or the limiting need, a value is used that is selected as a function of a distribution that has already taken place.

9. A drive unit for a hybrid vehicle, comprising:
   an electrical energy storage device,
   an internal combustion engine,
   a first electric machine,
   a second electric machine, and
   a drive shaft,
   wherein the internal combustion engine and the first electric machine are directly mechanically coupled, the second electric machine and the drive shaft are directly mechanically coupled, and the internal combustion engine and the drive shaft are variably mechanically coupled by a gear device, and wherein the drive unit includes a control unit and sensor devices for carrying out the method as recited in claim 1.

10. A hybrid vehicle that includes a drive unit, wherein the drive unit is designed according to claim 9.

* * * * *